United States Patent [19]
Baden et al.

[11] Patent Number: 5,509,002
[45] Date of Patent: Apr. 16, 1996

[54] OPERATION OF A CDMA NET

[75] Inventors: Charlotte C. E. Baden, Malmesbury; Anthony Martin, Chippenham, both of United Kingdom

[73] Assignee: AT&T Corp., Murray Hill, N.J.

[21] Appl. No.: 287,735

[22] Filed: Aug. 9, 1994

[30]  Foreign Application Priority Data

Aug. 20, 1993 [GB] United Kingdom ............... 9317330

[51] Int. Cl.⁶ ........................... H04B 7/005; H04J 13/00
[52] U.S. Cl. ........................... 370/18; 370/79; 375/205; 455/67.3
[58] Field of Search ................... 370/13, 17, 18, 370/19, 79; 375/200, 205, 208; 455/50.1, 54.1, 63, 67.3, 69

[56]  References Cited

U.S. PATENT DOCUMENTS

| 5,297,161 | 3/1994 | Ling | 455/69 X |
| 5,345,598 | 9/1994 | Dent | 455/67.1 X |
| 5,442,625 | 8/1995 | Gitlin et al. | 375/205 X |

FOREIGN PATENT DOCUMENTS 2264027  8/1992  United Kingdom .

OTHER PUBLICATIONS

"CDMA Reverse Link Open Loop Power Control", *IEEE Globecom '92*, Telecommunications Conference, pp. 70–73, Dec. 6–9, 1992, vol. 1 of 3.

"On The Capacity of a Cellular CDMA System "*IEEE Transactions on Vehicular Technology*, K. S. Gilhousen et al, pp. 303–311. vol. 40. No. 2. May 1991.

"Power Control Based Admission Policies in Cellular Radio Newtorks" *IEEE*N. Bambos and G. J. Pottie, pp. 863–67, Jun. 12, 1992.

*Primary Examiner*—Melvin Marcelo
*Attorney, Agent, or Firm*—Christopher M. K. Watts; Jason P. DeMont; David N. Fogg

[57]  ABSTRACT

A code-division multiple-access (CDMA) net can be used for efficiently carrying various types of traffic having different requirements, such as voice traffic and ISDN traffic. When a station requests a channel, the controller determines the quality level required by that station and calculates the appropriate power level for that station on the basis of the required quality level. At the same time it recalculates the power levels for the stations already having operative channels.

19 Claims, 1 Drawing Sheet

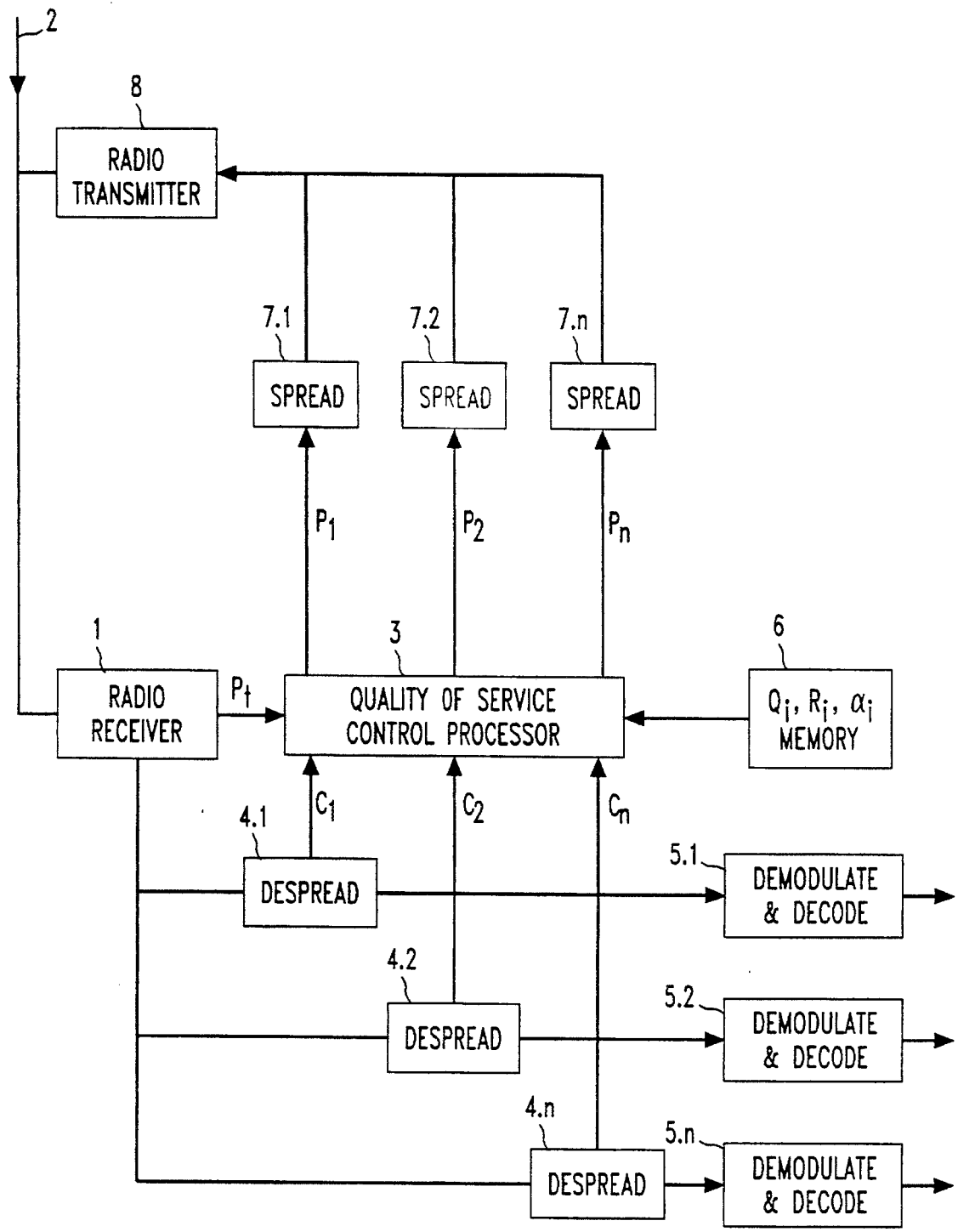

OPERATION OF A CDMA NET

RIGHT OF PRIORITY

Pursuant to 37 C.F.R. 1.78(a)(2), applicants claim the right of priority of copending British Patent Application 9317330.0, which was filed on Aug. 20, 1993.

TECHNICAL FIELD

This invention relates to code-division multiple access (CDMA) nets, and more particularly to methods of operation of and controllers for such nets.

BACKGROUND OF THE INVENTION

The use of code division is well known as a means of managing multiple access to a medium such as a radio band or optical fibre. For example, see Klein S. Gilhousen, On the Capacity of a Cellular CDMA System—IEEE Trans. on Vehicular Technology, vol. 40, no. 2, May 1991, pages 303–312. In such a system each subscriber is allocated a code which is used to encode the signal prior to transmission. The technique which will be particularly discussed in this specification is known as 'direct-sequence code-division multiple access' (DSCDMA). In this technique the traffic bearer is multiplied by a serial code at a rate known as the 'chip rate' (W) which is greater than the bit rate (R) by some factor (W/R) known as the 'spreading gain'. The resulting signal is recovered, in the presence of other co-frequency signals, by correlation with the spreading code. The codes allocated to different subscribers are chosen for their orthogonal properties to minimise cross-talk. In practice, however, non-ideal implementation, for example the difficulty or impossibility of maintaining exact synchronisation between the codes, makes true orthogonality impossible to achieve, and unwanted co-frequency channels manifest themselves as noise power in the wanted channel.

When a station requests a channel, the controller sets up the channel, which includes synchronising the code at the controller and the station and then, while the channel remains in operation, controlling the power level of the station so that the received power levels from all the stations with operative channels are the same.

SUMMARY OF THE INVENTION

According to a first aspect of the present invention there is provided a method of operating a code-division multiple-access (CDMA) net comprising receiving a channel request from a station and in response to said channel request: (a) setting up a CDMA channel for said station and (b) while said channel remains in operation, controlling the power level at which said station transmits into said channel; CHARACTERISED BY in step (a) determining a quality level required by said station, and determining power levels for said station and any other stations already having channels in operation to provide the respective required quality levels and in step (b) initially setting the power level of said station and adjusting the power levels of said other stations in accordance with said determined power levels.

According to a second aspect of the invention there is provided a controller for a code-division multiple-access (CDMA) net comprising means for receiving a channel request from a station; means for setting up a CDMA channel for said station in response to said request; and means for controlling the power level at which said station transmits into said channel while said channel remains in operation, CHARACTERISED IN THAT said means for setting up includes means for determining a quality level required by said station, and determining power levels for said station and any other stations already having channels in operation to provide the respective required quality levels and said means for controlling includes means for initially setting the power level of said station and adjusting the power levels of said other stations in accordance with said determined power levels.

We have found that a CDMA net can be efficiently used to carry a variety of different types of traffic, such as voice and ISDN data services which have widely differing bit rates and/or error rate requirements. One application of such a net would be as a radio local loop for a telecommunications network.

BRIEF DESCRIPTION OF THE DRAWING

An embodiment of the invention will now be described by way of example with reference to the accompanying drawing which shows the relevant parts of a controller embodying the invention.

DETAILED DESCRIPTION

The basic capacity equation for DS-CDMA is given in equation 1.

$$\frac{E_b}{N_0} = \frac{W/R}{(N-1)\alpha + \eta/S} \quad (1)$$

where

W is the spread bandwidth,

R is the symbol rate,

S is the received signal power,

N is the number of station having operative channels,

η is the background noise and

α is the activity factor, which accounts for the intermittent nature of the transmission when bursty data such as speech data are carried. For voice transmission α=0.5, whereas for ISDN data services α=1, since the data are not bursty.

Equation 1 refers to a CDMA net of conventional type, in which all of the stations are of the same type—all voice stations in the case of a telephone net, for example. We envisage the use of CDMA in a net in which stations are of different types, such as voice and ISDN data services. The stations will thus have different characteristics and requirements. For example, a voice station may have a data bit rate of 32 kb/s, depending on the type of coding used, an activity factor of 0.5 and a maximum bit error rate of $10^{-3}$, whereas an ISDN data station may have a data bit rate of 144 kb/s, an activity factor of 1.0 and require a maximum error rate of $10^{-6}$.

When the stations have various characteristics and requirements equation 1 has to be generalised to $$\left[\frac{E_b}{N_0}\right]_x = \frac{WS_x/R_x}{\left(\sum_{i \neq x} S_i \alpha_i + \eta\right)} \quad (2)$$

Defining $Q_x$ as a measure of the quality of service required by station x, $$Q_x \equiv \left[\frac{E_b}{N_0}\right]_x$$

equation 2 can be arranged to give $$S_x = \left( \sum_{i \neq x} S_i \alpha_i + \eta \right) \frac{Q_x R_x}{W} \quad (3)$$

which can be solved to give all of the $S_x$ $$S_x = \frac{\sigma_x \eta}{1 - \sum_i \alpha_i \sigma_i} \quad (4)$$

where $$\sigma_x = \frac{Q_x}{\frac{W}{R_x} + \alpha_x Q_x}$$

If we divide the stations into classes c of stations having the same requirements, equation 4 becomes $$S_c = \frac{\sigma_c \eta}{1 - \sum_{c'} n_{c'} \alpha_{c'} \sigma_{c'}} \quad (5)$$

where $n_c$ is the number of active stations in class c.

Therefore, given the requirements of the stations, appropriate power levels $S_x$ can be derived. When a station requests a channel, this affects the appropriate power levels of all of the stations having currently operative channels, so new power levels have to be calculated for all of the currently active stations.

The actual values of $S_x$ can be calculated from measurable properties of received signals as follows. The power $C_x$ of the despread signal for channel x is given by $$C_x = \frac{W}{R_x} S_x \alpha_x + \sum_{i \neq x} S_i \alpha_i + \eta$$

and the total received power $P_t$ is given by $$P_t = \sum_i S_i \alpha_i + \eta$$

Solving for $S_x$ and $\eta$ yields:

$$S_x = \frac{C_x - P_t}{\alpha_x \left( \frac{W}{R_x} - 1 \right)} \quad (6)$$

$$\eta = P_t - \sum_i S_i \alpha_i \quad (7)$$

The accompanying drawing shows the relevant parts of a controller embodying the invention. Those parts which are common to known controllers and are not relevant to the present invention are not shown, for the sake of clarity.

A radio receiver 1 is arranged to receive a radio signal from an antenna 2. The receiver 1 is connected to provide a signal indicative of the total received power $P_t$ to a quality of service control processor 3 and to deliver a spread-spectrum received signal to despread circuits 4.1, 4.2 ... 4.n. Each of the despread circuits 4.1, 4.2 ... 4.n is arranged to apply the code assigned to a respective channel so as to produce a signal in which the respective channel constitutes a narrow-band despread signal and the other channels appear as a broad-band background noise. These despread signals are applied to respective demodulator and decoder circuits 5.1, 5.2 ... 5.n which derive the output signals for the respective channels. The despread circuits 4.1, 4.2 ... 4.n also provide signals representing the powers of the respective despread signals $C_1, C_2 \ldots C_n$ to the quality of service control processor 3. A memory device 6 is arranged to provide signals representing the quality factor, data rate and activity factor $Q_i$, $R_i$ and $\alpha_i$ to the quality of service control processor 3.

The quality of service control processor is a computer programmed to calculate the background noise level $\eta$ and the actual values of the received signal power for the respective channels according to equations 6 and 7, to calculate the required values of the received signal power $S_x$ for the respective channels according to equation 4 or 5 and to derive power control signals $P_1, P_2 \ldots P_n$, representing the differences between the actual and required values of $S_x$. The power control signals $P_1, P_2 \ldots P_n$ are then applied to spreader circuits 7.1, 7.2 ... 7.n. The spreader circuits apply the codes assigned to control signals of the respective channels to provide spread-spectrum signals, which are then mixed with one another and with spread-spectrum data input signals for the channels from respective spreader circuits (not shown) and applied to a radio transmitter 8 which produces a radio-frequency output signal which is applied to the antenna 2.

The values of $Q_i$, $R_i$ and $\alpha_i$ provided by the memory device 6 may be extracted from a table held in a data-base forming part of the controller or they may be provided by the stations during the channel set-up procedure.

Further modifications of the controller specifically described will be apparent to persons skilled in the art to which the invention relates. For example, the power control signals $P_1, P_2 \ldots P_n$ may be sent as narrow-band signals instead of using spreader circuits 7.1, 7.2 ... 7.n.

We claim:

1. A method of operating a code-division multiple access (CDMA) net comprising receiving a channel request from a station and in response to said channel request:

(a) setting up a CDMA channel for said station and (b) while said channel remains in operation, controlling the power level at which said station transmits into said channel;

CHARACTERIZED BY in step (a) determining a quality level ($Q_x$) required by said station from a set of quality levels that correspond to types of stations, and determining power levels ($S_x$) for said station and any other stations already having channels in operation to provide the respective required quality levels and in step (b) initially setting the power level of said station and adjusting the power levels of said other stations in accordance with said determined power levels.

2. A method as claimed in claim 1 wherein said determining of a quality level comprises retrieving a predetermined quality level associated with said station from a table.

3. A method as claimed in claim 1 wherein said determining of a quality level comprises receiving an indication of said quality from said station.

4. A method as claimed in claim 1 wherein said CDMA net is a radio local loop of a telecommunications network.

5. A method of operating a code-division multiple access (CDMA) net comprising receiving a channel request from a station and in response to said channel request;

(a) setting up a CDMA channel for said station and (b) while said channel remains in operation, controlling the power level at which said station transmits into said channel;

CHARACTERIZED BY in step (a) determining a quality level ($Q_x$) required by said station, and determining power levels ($S_x$) for said station and any other stations already having channels in operation to provide the respective required quality levels wherein said power levels are determined in accordance with the relation:

$$S_x = \left( \sum_{i \neq x} S_i \alpha_i + \eta \right) \frac{Q_x R_x}{W}$$

where:

$S_x$ is the received power level of station x, $\alpha_i$ is the activity factor of station i, $\eta$ is the background noise level, $W/R_x$ is the spreading gain for station x and $Q_x$ is a measure of the quality level required by station x, being the ratio of $E_b/N_O$ where $E_b$ is the received energy per bit and $N_O$ is the received noise spectral density, and in step (b) initially setting the power level of said station and adjusting the power levels of said other stations in accordance with said determined power levels.

6. A method as claimed in claim 5 wherein said determining of a quality level comprises retrieving a predetermined quality level associated with said station from a table.

7. A method as claimed in claim 4 wherein said determining of a quality level comprises receiving an indication of said quality from said station.

8. A controller for a code-division multiple access (CDMA) net comprising a receiver that receives a channel request from a station;

a set-up circuit that sets up a CDMA channel for said station in response to said request; and a control circuit that controls the power level at which said station transmits into said channel while said channel remains in operation,

CHARACTERIZED IN THAT said set up circuit includes circuitry (3,6) that determines a quality level required by said station from a set of quality levels that correspond to types of stations, and that determines power levels for said station and any other stations already having channels in operation to provide the respective required quality levels and said control circuit includes circuitry (1, 3, 4.1, 4.2, 4.n) that initially sets the power level of said station and that adjusts the power levels of said other stations in accordance with said determined power levels.

9. A controller as claimed in claim 8 wherein said circuitry that determines a quality level is arranged to retrieve a predetermined quality level associated with said station from a table.

10. A controller as claimed in claim 6 wherein said circuitry that determines a quality level is arranged to receive an indication of said quality from said station.

11. A controller for a code-division multiple access (CDMA) net comprising a receiver that receives a channel request from a station;

a set up circuit that sets up a CDMA channel for said station in response to said request; and a control circuit that controls the power level at which said station transmits into said channel while said channel remains in operation,

CHARACTERIZED IN THAT said set up circuit includes circuitry (.3,6) that determines a quality level required by said station, and that determines power levels for said station and any other stations already having channels in operation to provide the respective required quality levels and said control circuit includes circuitry (1, 3, 4.1, 4.2, 4.n) that initially sets the power level of said station and that adjusts the power levels of said other stations in accordance with said determined power levels, wherein said control circuit is arranged to set and adjust said power levels in accordance with the relation:

$$S_x = \left( \sum_{i \neq x} S_i \alpha_i + \eta \right) \frac{Q_x R_x}{W}$$

where:

$S_x$ is the received power level of station x, $\alpha_i$ is the activity factor of station i, $\eta$ is the background noise level, $W/R_x$ is the spreading gain for station x and $Q_x$ is a measure of the quality level required by station x, being the ratio of $E_b/N_O$ where $E_b$ is the received energy per bit and $N_O$ is the received noise spectral density.

12. A controller as claimed in claim 11 wherein said circuitry that determines a quality level is arranged to retrieve a predetermined quality level associated with said station from a table.

13. A controller as claimed in claim 11 wherein said circuitry that determines a quality level is arranged to receive an indication of said quality from said station.

14. A telecommunications network having one or more radio local loops each comprising a controller for a code-division multiple access (CDMA) net said controller comprising a receiver that receives a channel request from a station;

a set up circuit that sets up a CDMA channel for said station in response to said request; and a control circuit that controls the power level at which said station transmits into said channel while said channel remains in operation,

CHARACTERIZED IN THAT said set up circuit includes circuitry (3,6) that determines a quality level required by said station from a set of quality levels that correspond to types of stations, and that determines power levels for said station and any other stations already having channels in operation to provide the respective required quality levels and said control circuit includes circuitry (1, 3, 4.1, 4.2, 4.n) that initially sets the power level of said station and that adjusts the power levels of said other stations in accordance with said determined power levels.

15. A network as claimed in claim 14 wherein said circuitry that determines a quality level is arranged to retrieve a predetermined quality level associated with said station from a table.

16. A network as claimed in claim 14 wherein said circuitry that determines a quality level is arranged to receive an indication of said quality from said station.

17. A telecommunications network having one or more radio local loops each comprising a controller for a code-division multiple access (CDMA) net said controller comprising a receiver that receives a channel request from a station;

(a) a set up circuit that sets up a CDMA channel for said station in response to said request; and (b) a control circuit that controls the power level at which said station transmits into said channel while said channel remains in operation.

CHARACTERIZED IN THAT said set up circuit includes circuitry (3,6) that determines a quality level required by said station, and that determines power levels for said station and any other stations already having channels in operation to provide the respective required quality levels and said control circuit includes circuitry (1, 3, 4.1, 4.2, 4.n) that initially sets the power level of said station and that adjusts the power levels of said other stations in accordance with said determined power levels, wherein said control circuit is arranged to set and adjust said power levels in accordance with the relation:

$$S_x = \left( \sum_{i \neq x} S_i \alpha_i + \eta \right) \frac{Q_x R_x}{W}$$

where:

$S_x$ is the received power level of station x, $\alpha$ is the activity factor of station i, $\eta$ is the background noise level, $W/R_x$ is the spreading gain for station x and $Q_x$ is a measure of the quality level required by station x, being the ratio of $E_b/N_O$ where $E_b$ is the received energy per bit and $N_O$ is the received noise spectral density.

18. A network as claimed in claim 17 wherein said circuitry that determines a quality level is arranged to retrieve a predetermined quality level associated with said station from a table.

19. A network as claimed in claim 17 wherein said circuitry that determines a quality level is arranged to receive an indication of said quality from said station.

* * * * *